United States Patent
Ohzeki et al.

(10) Patent No.: US 7,567,406 B2
(45) Date of Patent: Jul. 28, 2009

(54) METHOD OF WRITING PATTERN ON MAGNETIC DISK AND DEVICE THEREFOR

(75) Inventors: Hideki Ohzeki, Kanagawa (JP);
Kazuyuki Ishibashi, Kanagawa (JP);
Shunichiroh Ohta, Tokyo (JP); Tatsuo Takagi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 2 days.

(21) Appl. No.: 11/880,148

(22) Filed: Jul. 20, 2007

(65) Prior Publication Data
US 2008/0030890 A1 Feb. 7, 2008

(30) Foreign Application Priority Data
Jul. 21, 2006 (JP) .............................. 2006-199638

(51) Int. Cl.
*G11B 5/596* (2006.01)
(52) U.S. Cl. .................... 360/77.08; 360/75; 360/77.06
(58) Field of Classification Search ........................ None
See application file for complete search history.

(56) References Cited

U.S. PATENT DOCUMENTS

| 5,296,995 | A | 3/1994 | Yonezawa et al. |
| 6,215,606 | B1* | 4/2001 | Chainer et al. ................ 360/31 |
| 6,549,360 | B1 | 4/2003 | Xuan et al. |
| 7,154,689 | B1* | 12/2006 | Shepherd et al. ............... 360/48 |
| 2005/0052767 | A1* | 3/2005 | Miyata et al. ................. 360/31 |
| 2006/0023344 | A1* | 2/2006 | Kurihara et al. .......... 360/77.08 |

FOREIGN PATENT DOCUMENTS

| JP | 11-045528 | 2/1999 |
| JP | 2000-173047 | 6/2000 |

* cited by examiner

*Primary Examiner*—Jason C Olson
(74) *Attorney, Agent, or Firm*—Townsend and Townsend and Crew LLP; Rambod Nader

(57) ABSTRACT

Embodiments of the present invention provide accurate pitch control of a servo write track. A Self-Servo-Write (SSW) according to an embodiment of the present invention determines a reference APC by reading a mark formed on the recording surface corresponding to the propagation head prior to starting the product servo pattern writing. The accurate size of the mark in the radial direction is known previously. The reference APC is for determining the track pitch, and by using the mark with the determined size, the product servo patterns can be written with a desired and accurate track pitch.

12 Claims, 10 Drawing Sheets

METHOD OF WRITING PATTERN ON MAGNETIC DISK AND DEVICE THEREFOR

CROSS-REFERENCE TO RELATED APPLICATION

The instant nonprovisional patent application claims priority to Japanese Patent Application No. 2006-199638 filed Jul. 21, 2006 and incorporated by reference in its entirety herein for all purposes.

BACKGROUND OF THE INVENTION

As disk drive devices, devices using various types of recording disks such as optical disks, magnetooptical disks, or flexible magnetic disks are known. Among those, the hard disk drives (HDD) have been widely prevalent as storage devices for computers, and become one of the essential storage devices in the present computer systems. Further, the usage of the HDD is not limited to the computer systems, but is increasingly growing to, for example, moving image recording/reproducing devices, car navigation systems, mobile phones, or removable memories used in digital cameras or the like because of the superior characteristics.

The magnetic disk used in the HDD is provided with a plurality of data tracks and servo tracks formed concentrically. The servo track includes a plurality of servo data (servo patterns) distant from each other in the circumferential direction. User data is recorded in each area between servo sectors. By a head element section as a thin film element accessing a desired area (address) in accordance with the servo data, writing of the user data or retrieval of the user data can be performed.

Each servo pattern (in the present specification, this is referred to as a product servo pattern) is composed of a cylinder ID, a sector number, a burst pattern, and so on. The cylinder ID represents a track address, and the sector number represents a sector address in the track. The burst pattern includes relative position information of the magnetic head with respect to the track.

As described above, the product servo patterns are formed in each of the tracks distant from each other in the circumferential direction as a plurality of sectors. Each of the product servo patterns existing in the same position in the circumferential direction, namely having the same sector numbers is uniform in the position (phase) in the circumferential direction throughout the entire tracks. The product servo patterns are written on the magnetic disk in a factory before the HDD is shipped as a product. Conventional writing of the product servo pattern is performed using a servo writer as an external device. The HDD is mounted on the servo writer, and the servo writer positions the head in the HDD by a positioner (an external positioning mechanism) to write the product servo patterns generated by a product servo pattern generation circuit on the magnetic disk.

Presently, the product servo pattern writing process (servo track write (STW)) has a principal place in the manufacturing cost of the HDD. Especially in recent years, competition of the HDD in increasing capacity has intensified, resulting in the advancement of increases in tracks per inch (TPI). By increasing the TPI, the number of tracks increases, and the track width (track pitch) becomes smaller. These advances increase the STW time and also increase the high precision of the servo writer, thus causing increase in the STW cost. As such, there is a need for reducing the cost of the servo writer, shortening of the STW time, and so on.

As one measure of solving the above problems, self-servo-writing (SSW) has been proposed. In contrast to the conventional STW, in the SSW only the mechanical mechanism of the HDD itself is used, and a spindle motor (SPM) and a voice coil motor (VCM) in the HDD are controlled from an external circuit to write the product servo patterns using the external circuit. Thus, the cost reduction of the servo writer is achieved.

In the SSW, utilizing that the read element and the write element of the head element section are different in the positions in the radial direction (referred to as a read/write offset, in the present specification), positioning of the head element section is performed while the read element is reading the patterns already written in the inner circumferential side or the outer circumferential side, and the write element writes new patterns on the desired track the read/write offset distant therefrom. In the SSW, in addition to the product servo patterns, other patterns are written on the recording surface, and head positioning control and timing control are performed using the patterns.

Typically, the HDD has a plurality of recording surfaces, a plurality of head element sections each corresponding to the respective one of the recording surfaces, and an actuator for supporting the plurality of element sections. In the SSW, the patterns on the recording surface are read using one head element section (referred to as a propagation head in the present specification) selected from the plurality of head element sections, and the actuator is controlled using the signal of the patterns thus read, thereby performing positioning of the plurality of head element sections. In the positioned state, the patterns are simultaneously written on each of the recording surfaces by all of the head element sections.

In writing the product servo patterns, it is important to accurately position the head element section to the desired positions. It should be noted that although differing from the SSW, Japanese Patent Publication No. 11-45528 ("patent document 1"), for example, discloses that, in order for writing the servo information on the magnetic disk medium with high accuracy, a convexoconcave pattern is formed on the reverse side of the magnetic disk, and positioning of the head is performed by reading out the pattern.

In writing the product servo patterns by the SSW, it is important to write the patterns for each track with a desired track pitch. One of the measures therefor is to actually read the written patterns to compare the read values with previously determined reference values. By performing the position control of the head so that the measured values correspond to the reference values, the track pitch is controlled. Thus, the track pitch can be made to correspond to a desired value.

Specifically, in the SSW, function values of the read amplitudes of the patterns in three tracks adjacent to each other are calculated to move the head so that the function values correspond to the previously determined reference values. The reference values can be determined by writing ideal patterns on the HDD, which are designed uniformly, using the rotary positioner and then actually measuring the function values of the patterns.

The track pitch has a different value for every head element section. This is because the track pitch varies in accordance with the read width or the write width in addition to the reference values. In servo writing, depending on the design, there are some cases in which it is desirable to write the product servo patterns with a specific pitch regardless of the head. Further, in the actual SSW, variations among products exist. Therefore, in some products, the track pitch of the product servo patterns is substantially shifted from the desired value.

BRIEF SUMMARY OF THE INVENTION

Embodiments in accordance with the present invention accurately perform pitch control of a servo write track. Self-servo-writing (SSW) according to the particular embodiment of FIG. 10 determines a reference APC by reading the mark 411 formed on the recording surface corresponding to the propagation head prior to starting the product servo pattern writing. The accurate size of the mark 411 in the radial direction is known previously. The reference APC is for determining the track pitch, and by using the mark 411 with the determined size, the product servo patterns can be written with a desired and accurate track pitch.

DETAILED DESCRIPTION OF THE INVENTION

Figure 1:
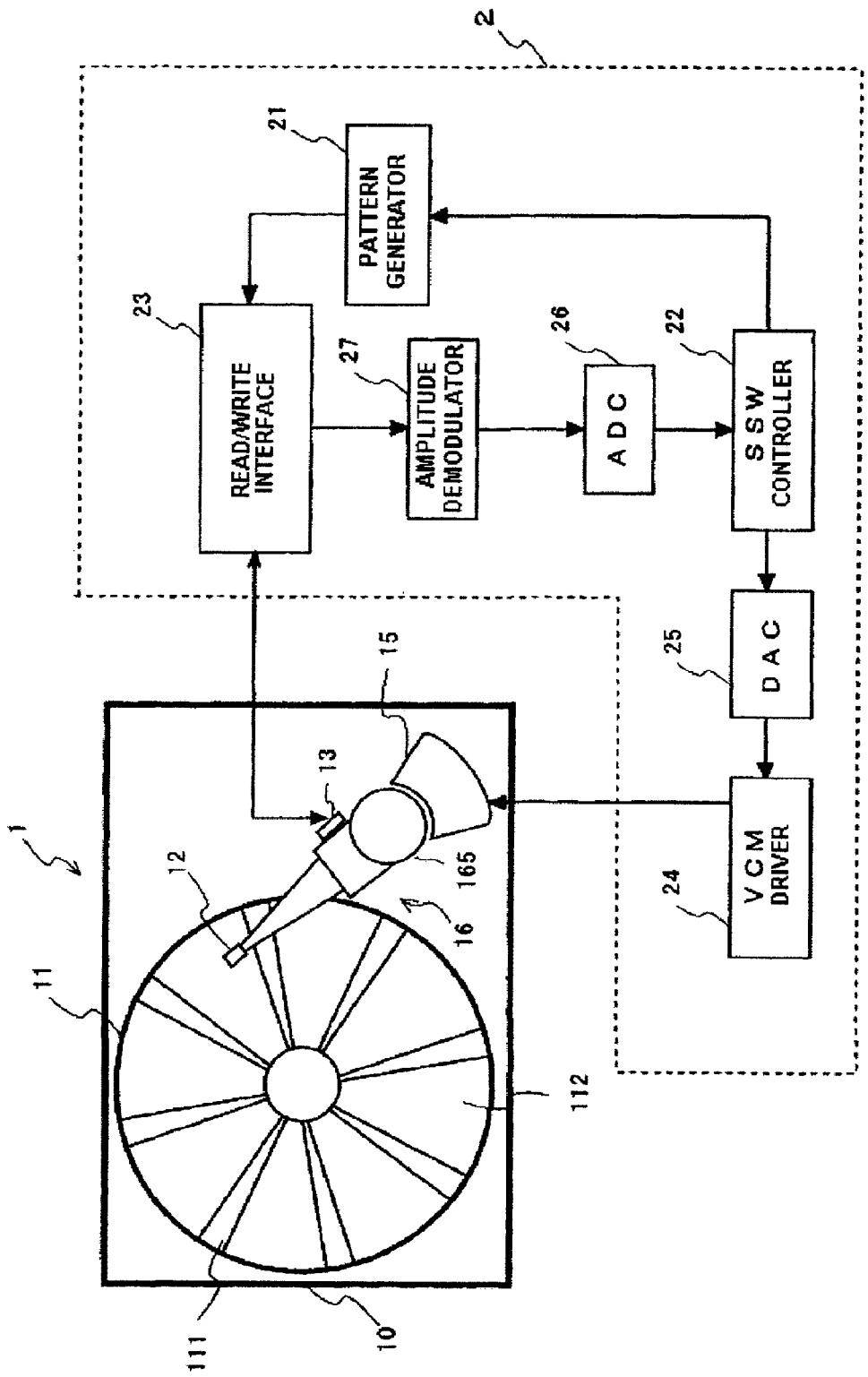
FIG. 1 is a block diagram schematically showing HDA and the logical configuration of a servo write control device for controlling the servo writing of the HDA according to one embodiment.

Embodiments in accordance with the present invention relate to a method of writing a pattern on a magnetic disk and a device therefor, and particularly to pattern writing using a magnetic head having a read element and a write element differently positioned in the radial direction of the magnetic disk.

An aspect of embodiments according to the present invention is a method of writing a pattern on a recording surface of a magnetic disk using a magnetic head having a read element and a write element positioned differently in the radial direction of the magnetic disk. In the method, an area including a mark previously provided to the magnetic disk and having a known size in the radial direction of the magnetic disk is read by the read element. Further, the size of the mark expressed by a reference amount is specified based on a magnetic signal obtained by reading the area by the read element. Then, a track pitch is determined based on the specified size of the mark. Further, a new pattern is written by the write element while performing positioning by reading by the read element the pattern written by the write element in accordance with the determined track pitch. By determining the track pitch based on the specified size of the mark, the pattern can be written with a desired accurate pitch.

A pattern may be written with an initial track pitch by the write element, and the track pitch for writing a new pattern is determined by correcting the initial track pitch based on the initial track pitch expressed with the reference amount and the specified size of the mark. Further, it is preferable that the area is read by the read element in the condition in which the pattern of the initial track pitch is read by the read element and the positioning is performed, and the size of the mark is specified using the reference amount specified by the read signal of the pattern with the initial track pitch. Alternatively, the value defining the initial track pitch showing overlap in the radial direction between the adjacent patterns in the initial track pitch is preferably corrected based on the specified size of the mark, thereby determining the track pitch of the new pattern. By this configuration, the track pitch for easily and accurately writing a new pattern can be determined.

The mark is defined by a convexoconcave shape on the magnetic disk, a pattern is written by a write element on an area overlapping the mark, and the size of the mark expressed by a reference amount is specified based on a magnetic signal obtained by reading the pattern in the area overlapping the mark by the read element. Thus, the size of the mark can easily and accurately be specified. Further, the mark is formed of a continuous area, and preferably has a greater size in the radial direction of the magnetic disk than a read width. Thus, the size can be measured more accurately by the read element.

Another aspect of embodiments according to the present invention is a device for writing a pattern on a recording surface of the magnetic disk. The device is provided with a magnetic head having a read element and a write element positioned differently in the radial direction of the magnetic disk, a moving mechanism for supporting the magnetic head, and for moving the magnetic head, and a controller for controlling operations of the moving mechanism and the magnetic head. The read element reads an area including a mark previously provided to the magnetic disk and having a known size in the radial direction of the magnetic disk. The controller specifies the size of the mark expressed with the reference amount based on the magnetic signal obtained by reading the area by the read element, and determines the track pitch based on the specified size of the mark. The moving mechanism performs positioning of the magnetic head by reading, by the read element, the pattern written by the write element based on the determined track pitch. The write element writes a new pattern to the magnetic disk in the positioned condition. By determining the track pitch based on the specified size of the mark, the pattern can be written with a desired accurate pitch.

The write element may write a pattern with an initial track pitch, and the controller determines the track pitch for writing a new pattern by correcting the initial track pitch based on the initial track pitch expressed with the reference amount and the specified size of the mark. Further, the read element may read the area by the read element in the condition in which the pattern of the initial track pitch is read and the positioning is performed, and the controller specifies the size of the mark using the reference amount specified by the read signal of the pattern with the initial track pitch. Alternatively, the controller may correct the value defining the initial track pitch showing overlap in the radial direction between the adjacent patterns in the initial track pitch based on the specified size of the mark, thereby determining the track pitch of the new pattern.

The mark may be defined by a convexoconcave shape on the magnetic disk, the write element writes a pattern on an area overlapping the mark, the read element reads a pattern in the area overlapping the mark, and the controller specifies the size of the mark expressed with the reference amount based on the magnetic signal obtained in reading the pattern by the read element.

According to embodiments of the present invention, the servo pattern can be written accurately and with a desired track pitch.

Hereinafter, an embodiment capable of applying the present invention will be explained. For the sake of clarification of the explanations, the descriptions and drawings below include omissions and simplifications accordingly. Further, in each of the drawings, the same elements are denoted with the same reference numerals, and for the sake of clarification of explanations, duplicated explanations will be omitted according to needs. Hereinafter, an embodiment of the present invention will be explained taking writing of the servo patterns in a hard disk drive (HDD), which is an example of a disk drive device, as an example.

FIG. 1 is a block diagram schematically showing a head disk assembly (HDA) 1 and the logical configuration of a servo write control device 2 for controlling the servo writing of the HDA 1. The HDA 1 is a configuration element of the hard disk drive (HDD), and has a chassis 10 including a base and a top cover for closing a top opening of the base. The HDA 1 has a magnetic disk 11, a head slider 12, a preamplifier IC 13, a voice coil motor (VCM) 15, and an actuator 16 housed in the chassis, wherein the actuator 16 supports the head slider 12 at the tip section thereof. Further, the preamplifier IC 13 is fixed near a pivot shaft 165 of the actuator 16.

The HDD is provided with a circuit board fixed to the outside of the chassis 10 in addition to the HDA 1. On the circuit board, there is mounted an IC for performing signal processing and control processing. In servo writing of the present embodiment, the circuit on the control circuit board is not used, but the servo write control device 2 controls servo writing. In the servo writing of the present invention, the mechanical mechanism of the HDA 1 is directly controlled to write the servo data (servo patterns) on the magnetic disk 11. The magnetic disk 11 is a nonvolatile storage disk for storing data by magnetizing the magnetic layer. This kind of servo writing is called self-servo-writing (SSW).

The magnetic disk 11 is fixed to a rotary shaft of a spindle motor (not shown), and rotates at a predetermined angular velocity. Typically, the both surfaces of the magnetic disk 11 are the recording surfaces, and the HDA 1 is provided with a plurality of head sliders 12 corresponding to the respective recording surfaces. The actuator 16 is linked with the VCM 15, and rotates around the pivot shaft 165, thereby moving the head sliders 12 on the respective recording surfaces of the magnetic disk 11 in the radial direction. The head slider 12 has a slider and a head element section (not shown in FIG. 1) as a thin film element provided to the slider. The head element section as an example of the head is provided with a write element for converting an electric signal into a magnetic field in accordance with the write data, and a read element for converting the magnetic field from the magnetic disk 11 into an electric signal.

The preamplifier IC 13 selects one head slider for reading the data out of the plurality of head sliders 12, amplifies the reproduction signal reproduced from the selected head slider with a certain gain, and then outputs it to the servo write control device 2. Further, the preamplifier IC 13 amplifies the signal from the servo write control device 2, and then outputs it to the selected head slider. Typically, in writing the product servo pattern, all of the head sliders 12 are selected simultaneously. It should be noted that it is possible that a part of them is selected and writing is performed in sequence.

In the SSW, each of the composing elements inside the chassis 10 is used to write the servo data, which is used in writing or reading the user data, on the magnetic disk 11. Hereinafter, the servo data is referred to as a product data pattern. It should be noted that it is also possible to perform the servo writing of the present embodiment using a control circuit implemented in the HDD.

The servo write control device 2 controls and performs the SSW of the present embodiment. The servo write control device 2 has an SSW controller 22. The SSW controller 22 controls the whole of the SSW. The SSW controller 22 performs the positioning control of the head slider 12, the pattern generation control, and so on. The SSW controller 22 can be configured by a processor, which operates in accordance with microcodes stored previously. The SSW controller 22 performs the control process in accordance with a request from an external information processing device, and transmits necessary information such as error information to the information processing device.

In writing the patterns on the magnetic disk, the SSW controller 22 instructs a pattern generator 21, and the pattern generator 21 generates predetermined patterns. A read/write interface 23 performs conversion process of the patterns generated by the pattern generator 21, and transmits a pattern signal to the preamplifier IC 13. The preamplifier IC 13 amplifies the signal and transfers it to the head slider 12, and the head slider 12 writes the patterns on the magnetic disk 11.

The SSW controller 22 controls the actuator 16 using the signal read by the head slider 12 to move and position the head slider 12. Specifically, the signal read by the head slider 12 is input in an amplitude demodulator 27 via the RW interface 23. The read signal on which the amplitude demodulator 27 performs the demodulation process is AD-converted by an AD converter 26, and is input to the SSW controller 22. The SSW controller 22 analyzes the obtained digital signal to calculate a numerical control signal.

The SSW controller 22 sends the value to a DA converter 25. The DA converter 25 performs DA conversion on the obtained data, and provides a control signal to the VCM driver 24. The VCM driver 24 supplies the VCM 15 with a control current in accordance with the control signal to move and position the head slider 12. In the present specification, the device including the servo write control device 2 and configuration elements of the HDA 1 other than the magnetic disk 11, is called a self-servo-track-writer (SSTW). In other words, the SSTW writes the servo patterns on the recording surface of the magnetic disk 11.

On the recording surface of the magnetic disk 11, there is formed by the SSW a plurality of servo areas 111 radiating from the center of the magnetic disk 11 in the radial direction at every predetermined angle. FIG. 1 exemplifies eight servo areas. Each servo area 111 is provided with the product servo pattern recorded thereon for performing the position control of the head slider in reading/writing the user data. The area between the two adjacent servo areas 111 is a data area 112 where the user data is to be recorded. The servo areas 111 and the data areas 112 are alternately provided with predetermined angles.

Figure 2:
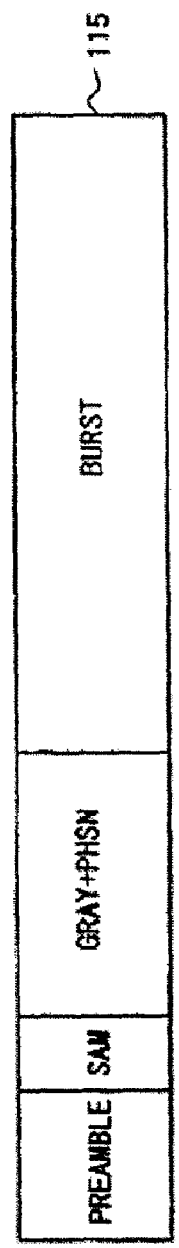
FIG. 2 shows a data format of a product servo pattern for one servo sector according to one embodiment.

FIG. 2 shows an example of a data format of the product servo pattern 115 for one servo sector. In one servo area 111, the product servo pattern 115 for one servo sector is formed in the circumferential direction, and the product servo patterns 115 of a plurality of servo sectors are formed in the radial direction. The product servo pattern 115 is composed of a preamble (PREAMBLE), a servo address mark (SAM), a track ID (GRAY) formed of a gray code, a servo sector number (PHSN), and a burst pattern (BURST). The SAM is a part for indicating that the actual information such as the track ID begins, and a SAM signal, which is a timing signal usually coming out when the SAM is detected, has an accurate relation to the position where the SAM is written on the magnetic disk 11.

Figure 5:
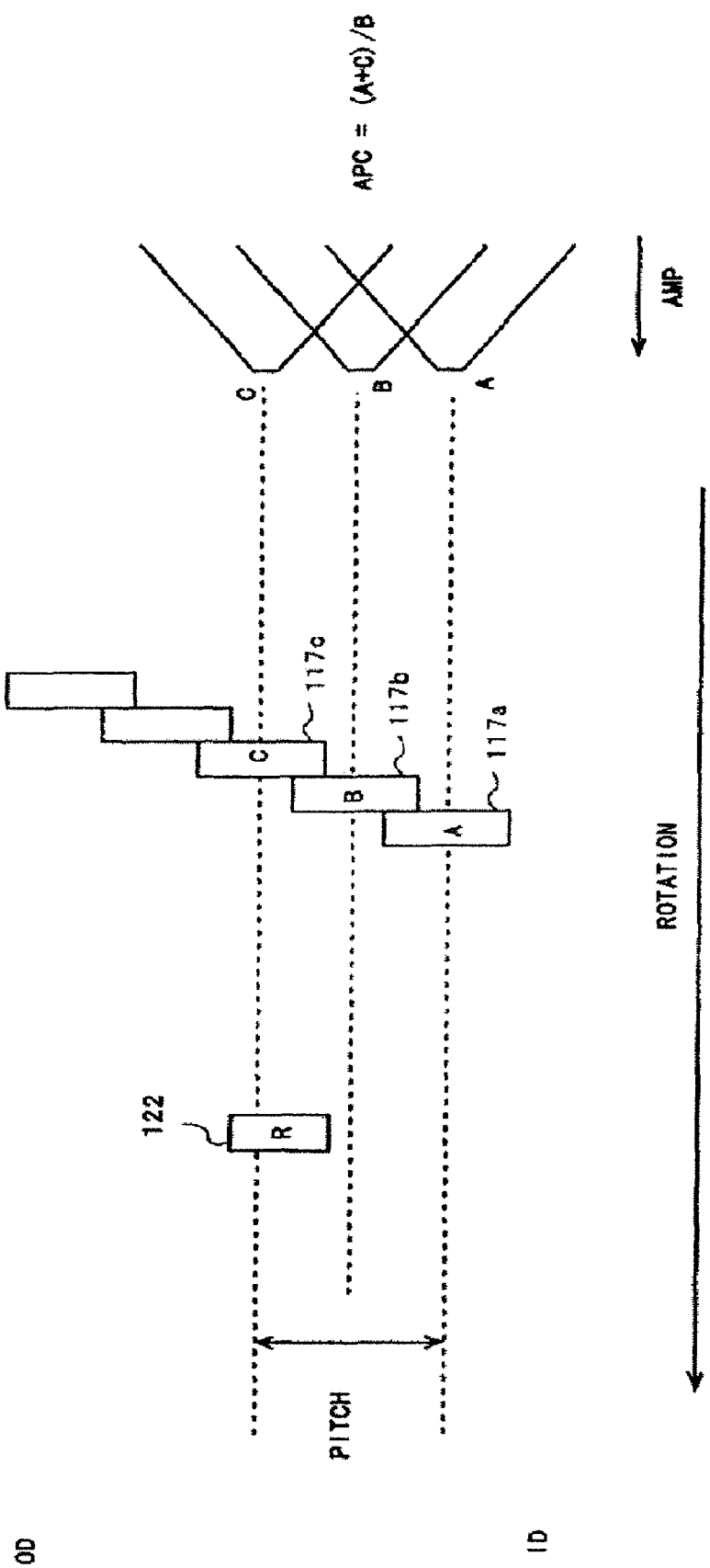
FIG. 5 is a diagram schematically showing a condition of calculating an APC from the read amplitudes A, B, and C of radial patterns 117a through 117c of three servo write tracks adjacent to each other.

Further, the burst pattern (BURST) is a signal that represents further precise position of the servo track denoted by the track ID. The burst pattern is typically provided with four amplitude signals of A, B, C, and D written in a zigzag at slightly different positions by the servo track on the orbit (see FIG. 5). Each of these bursts is a single frequency signal with the same period as the preamble (PREAMBLE).

Figure 3:
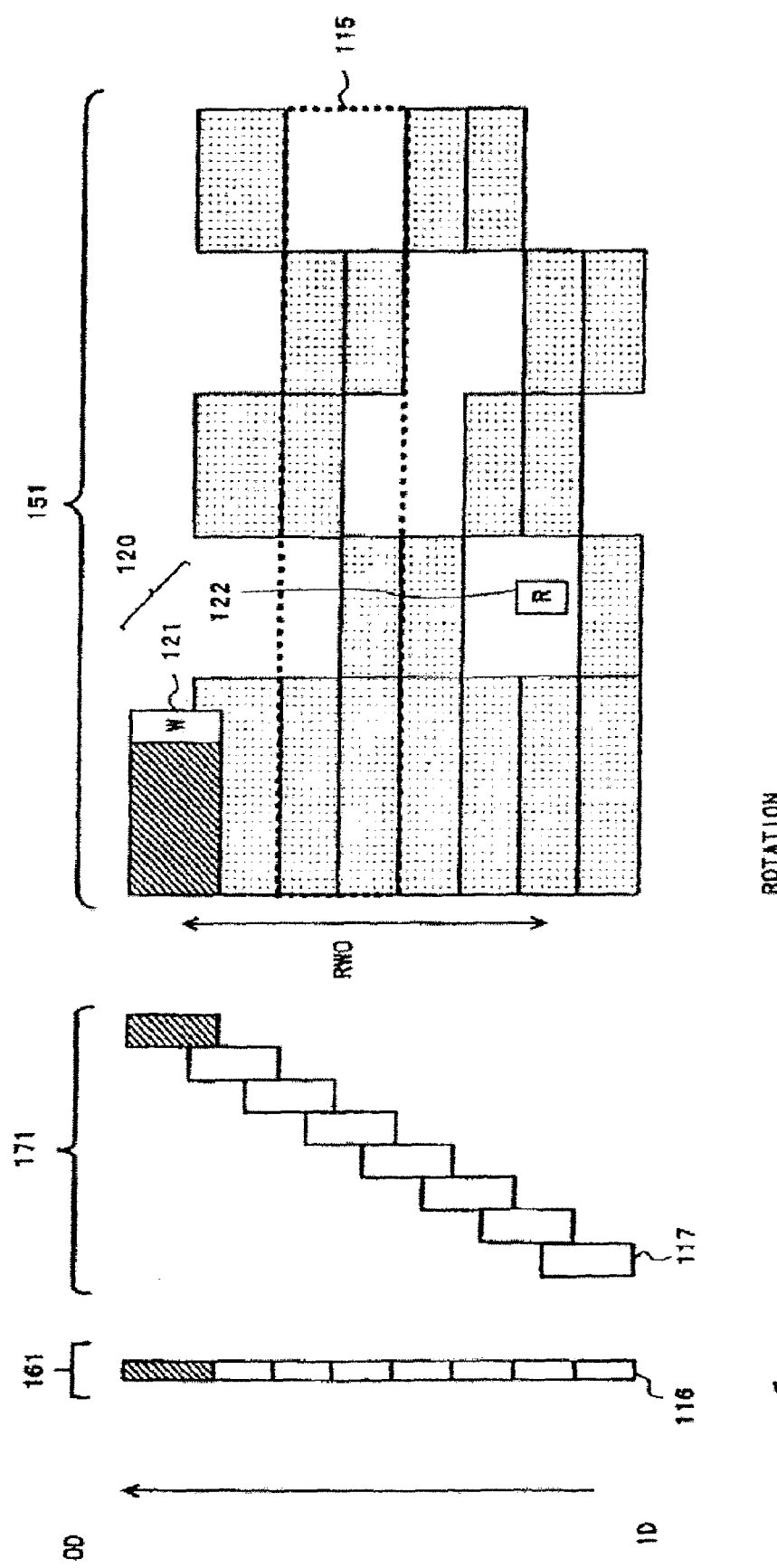
FIG. 3 schematically shows the pattern, which an SSTW writes on a recording surface, and a method of writing the pattern according to one embodiment.

FIG. 3 schematically shows the pattern, which the SSTW according to the present embodiment writes on the recording surface, and the method of writing the pattern. FIG. 3 shows the pattern corresponding to one servo sector. The SSTW writes a timing pattern 116 and a radial pattern 117 in addition to the product servo pattern 115. The timing pattern 116 is a pulsed pattern, and the radial pattern 117 is a burst with a predetermined frequency. The width (the size of the magnetic disk in the radial direction) of the radial pattern 117 becomes the same as the write width. Therefore, one sector in the SSW according to the present embodiment includes an area 151 for writing the product servo pattern 115, an area 161 for writing one slot of timing pattern 116, and an area 171 for writing one slot of radial pattern 117. The timing pattern 116 and the radial pattern 117 are written to the data area 112 for storing the user data.

The SSTW refers to the pattern written to the magnetic disk 11 by itself, and writes the next pattern at the position shifted in the radial direction as much as the read/write offset while performing temporal (the timing control in the circumferential direction) and spatial (the position control in the radial direction) control of the head element section 120 using the temporal and spatial information obtained from the signal. The read/write offset (RWO) is a distance in the radial direction between the write element 121 and the read element in the head element section 120, and specifically, a distance between the centers of the read element 122 and the write element 121 in the radial direction of the magnetic disk 11. The read/write offset varies depending on the radial position on the magnetic disk 11.

The SSTW according to the present embodiment selects one out of the plurality of head element sections 120, and reads the pattern on the recording surface with the selected head element section 120. This head element section 120 is called a propagation head in the present specification. Further, the SSTW controls the actuator 16 using the signal read by the propagation head, and simultaneously writes the respective patterns on each of the recording surfaces with all of the head sliders 12.

According to the present embodiment, as shown in FIG. 3, the read element 122 is disposed on the inner circumferential (ID) side of the write element 121 of the magnetic disk 11. The pattern is written from the inner circumferential side towards the outer circumferential side. By writing the pattern from the inner circumferential side, it becomes possible to read the pattern written previously by the write element 121 by the read element 122. Thus, it becomes possible for the write element 121 to write the new pattern while performing positioning of the head element section 120 by the pattern read by the read element 122. It should be noted that by changing the positions of the write element 121 and the read element 122, it becomes possible to start SSW from the outer circumferential side of the magnetic disk 11.

Specifically, the SSTW performs positioning of the head element section 120 using the radial pattern 117, and measures the timing of writing the pattern based on the timing pattern 116. The write element 121 of each of the head element section 120 writes (a part of) the product servo pattern 115 when predetermined time has elapsed from the timing the read element 122 of the propagation head has read the timing pattern. Further, the timing pattern 116 of the subsequent sector is written based on the reading of the timing pattern 116 in the previous sector.

As shown in FIG. 3, the write element 121 writes each of the product servo patterns 115 so as to partially overlap each other in the radial direction. In other words, in forming each of the product servo patterns, a part of each of the patterns is overwritten on the pattern on the outer circumferential side. In FIG. 3, there are shown three product servo patterns 115, which have already been written, and the write element 121 is on the way of forming the fourth product servo pattern from the inner circumferential side.

The write element 121 writes a half the product servo pattern while the magnetic disk makes one revolution. In the present specification, the track corresponding to a half the product servo pattern is called a servo write track. Further, the track of the product servo pattern is called a servo track. The track pitch of the servo write track is a half the servo track pitch. In the example shown in FIG. 3, seven servo write tracks have already been written, and the write element 121 is on the way of writing the eighth servo write track from the inner circumferential side.

The timing patterns 116 in the same sector are formed at substantially the same positions in the circumferential direction. On the other hand, each of the radial patterns 117 is formed at different positions in the circumferential direction from the adjacent radial pattern 117 in the radial direction. In other words, each of the radial patterns 117 adjacent to each other is different in the circumferential position. Further, in the radial direction, each of the radial patterns 117 adjacent to each other is formed so as to overlap each other.

Figure 4:
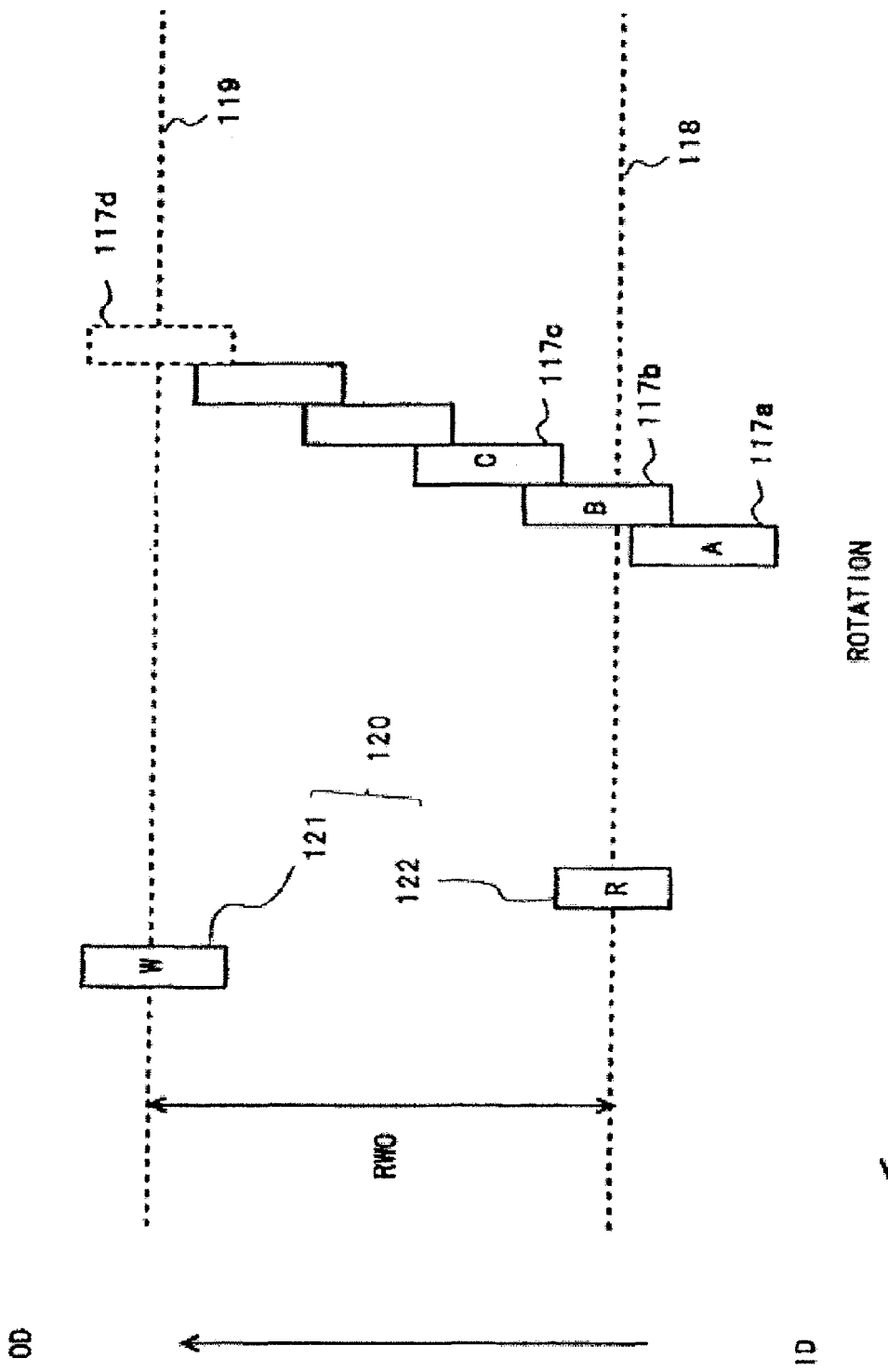
FIG. 4 schematically shows an example of positioning the read element to a target position and writing a pattern with a write element according to one embodiment.

The SSW controller 22 performs head positioning using the read signal of the radial patterns 117. Specifically, an example of positioning the read element 122 at the target position 118 will be explained with reference to FIG. 4. The size of the read element 122 in the radial direction shown in FIG. 4 corresponds to the read width, and the size of the write element 121 corresponds to the write width. The magnetic disk 11 rotates from the right to the left of the drawing, and the read element 122 moves from the left to the right of the drawing. The write element 121 writes the corresponding servo write track at the target position 119.

In order for positioning the write element 121 on the target position 119, the SSW controller 22 positions the read element 122 on the target position 118 which is inner circumferential side of the target position 119 as much as the read/write offset (RWO). The read element 122 reads the radial patterns 117a, 117b, and 117c. The SSW controller 22 obtains the function value (referred to as a PES value, in the present specification) of the amplitudes (assuming A, B, and C) of each of the radial patterns 117a, 117b, and 117c, and then positions the read element 122 so that the function value becomes the target value. For example, (A−C)/(2B−A−C) can be used as the PES value.

In the condition in which the read element 122 is positioned at the target position 118, the write element 122 writes the radial pattern 117d. It should be noted that in the step of writing each of the patterns, typically the target position of the read element 122 does not correspond to the center of each of the radial pattern 117, but is shifted in the radial direction.

As described above, the SSW according to the present embodiment writes the patterns to the servo write tracks sequentially from the inner circumferential side. In order for allowing the write element 121 to write the patterns to the target servo write tracks, it is required to position the read element 122 on the inner circumferential side of the target position of the write element 121 as much as the read/write offset. Further, the read/write offset varies in accordance with the radial position. Therefore, in writing the patterns in each of the servo write tracks, the SSW controller 22 specifies the read/write offset corresponding to the servo write track, and calculates the target position of the read element 122, moves and positions the read element 122 in accordance with the read/write offset.

Further, the SSW controller 22 sequentially moves the head slider 12 so that the value called APC becomes equal (close) to a predetermined value. Thus, the product servo patterns with a desired pitch are written to each of the recording surfaces. The APC is calculated from the read amplitudes A, B, and C of the radial patterns 117a through 117c of three servo write tracks adjacent to each other as exemplified in FIG. 5. Specifically, in the condition in which the propagation head is positioned at the center of each of the radial patterns 117a through 117c, the read amplitudes A, B, and C of each of the radial patterns 117 are obtained. The APC is calculated by (A+C/B). The APC represents overlapping of the adjacent patterns in the radial direction, and defines the servo write track pitch.

Figure 6:
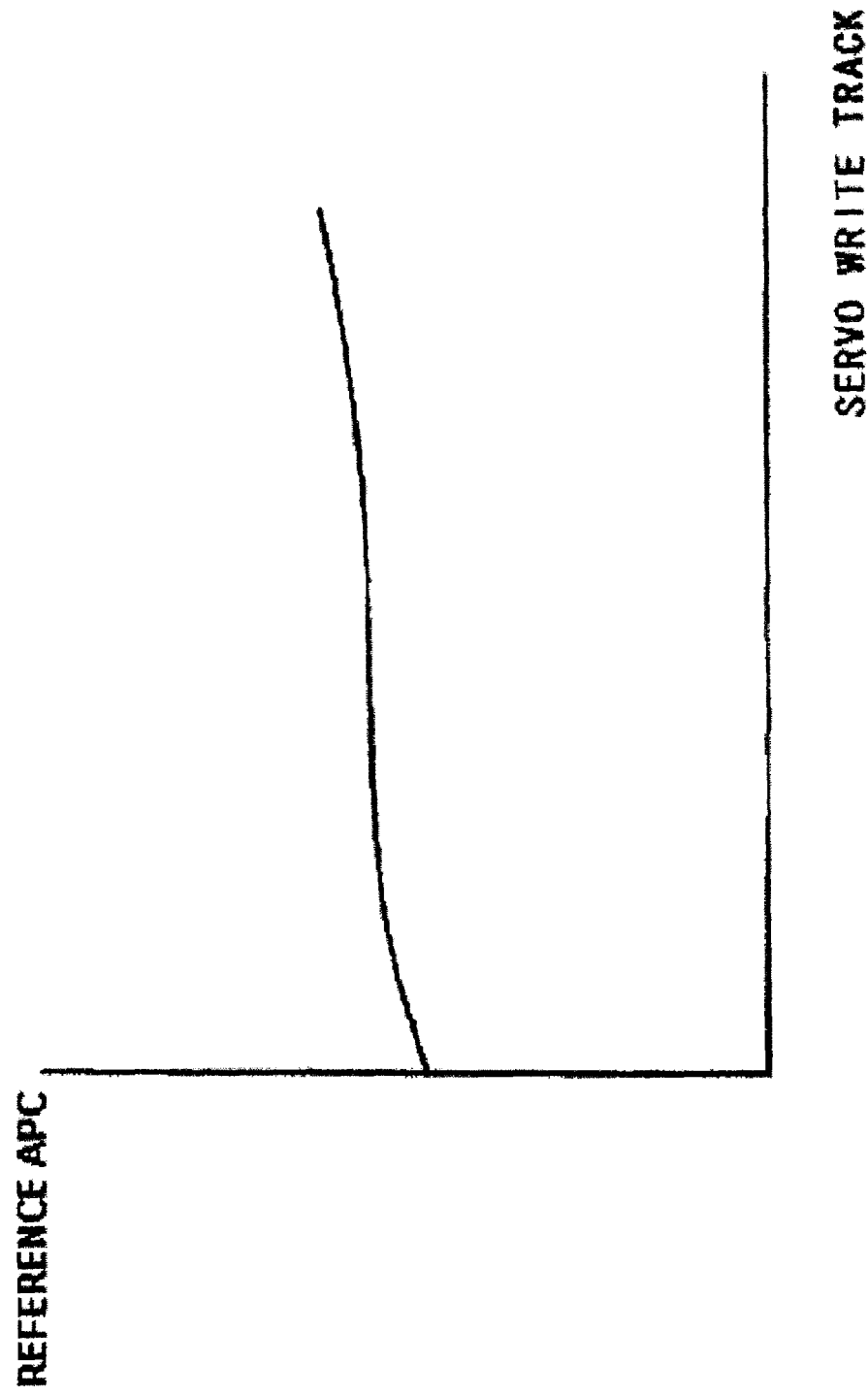
FIG. 6 schematically shows an example of a reference APC to a servo write track according to one embodiment.

The reference APC to be the target is previously determined to each of the servo write tracks prior to starting the product servo pattern writing. As exemplified in FIG. 6, the reference APC is not constant but varies in accordance with the servo write tracks (radial positions). The SSTW performs the control so that the servo write track pitch, namely the track pitch (see FIG. 5) of the servo track becomes the desired value by writing the patterns of each of the servo write track setting the reference APC as the target.

Specifically, the SSW controller 22 measures the APC every several hundreds of servo write tracks. The SSTW reads the radial patterns 117 with the read element 122 to calculate the APC from the read values. The SSW controller 22 determines the PES value of the target so that the measured APC value becomes equal (close) to the reference APC as the specified value.

The SSTW according to the present embodiment determines the reference APC by reading the mark formed on the recording surface corresponding to the propagation head prior to starting the product servo pattern writing. The accurate size of the mark in the radial direction is known previously. As described above, the reference APC is for determining the track pitch, and by using the mark with the determined size, the product servo patterns can be written with a desired and accurate track pitch.

Specifically, the SSTW actually measures the size of the mark in the radial direction, and corrects the previously registered reference APC in accordance with the measured value. Hereinafter, the reference APC before correction is called an initial reference APC. The initial reference APC is previously determined in the development stage. Specifically, it can be determined by writing the ideal radial patterns 117 with the same pitch in the same type of HDA using the rotary positioner and then measuring the APC of the radial patterns 117 in the different servo write track. Hereinafter, a method of determining the reference APC using the mark will specifically be explained.

The track pitch P of the servo track, namely the value twice as large as the servo write track pitch can be expressed as follows.

$$P = Ww + Wr(1-APC) \quad \text{(mathematical formula 1)}$$

Where, Ww denotes the write width, Wr denotes the read width. The SSW controller 22 can specify the write width Ww and the read width Wr by reading the burst pattern, which is written by the write element 121, by the read element 122. It should be noted that the write width Ww and the read width Wr vary according to the radial position because of the skew.

Figure 7:
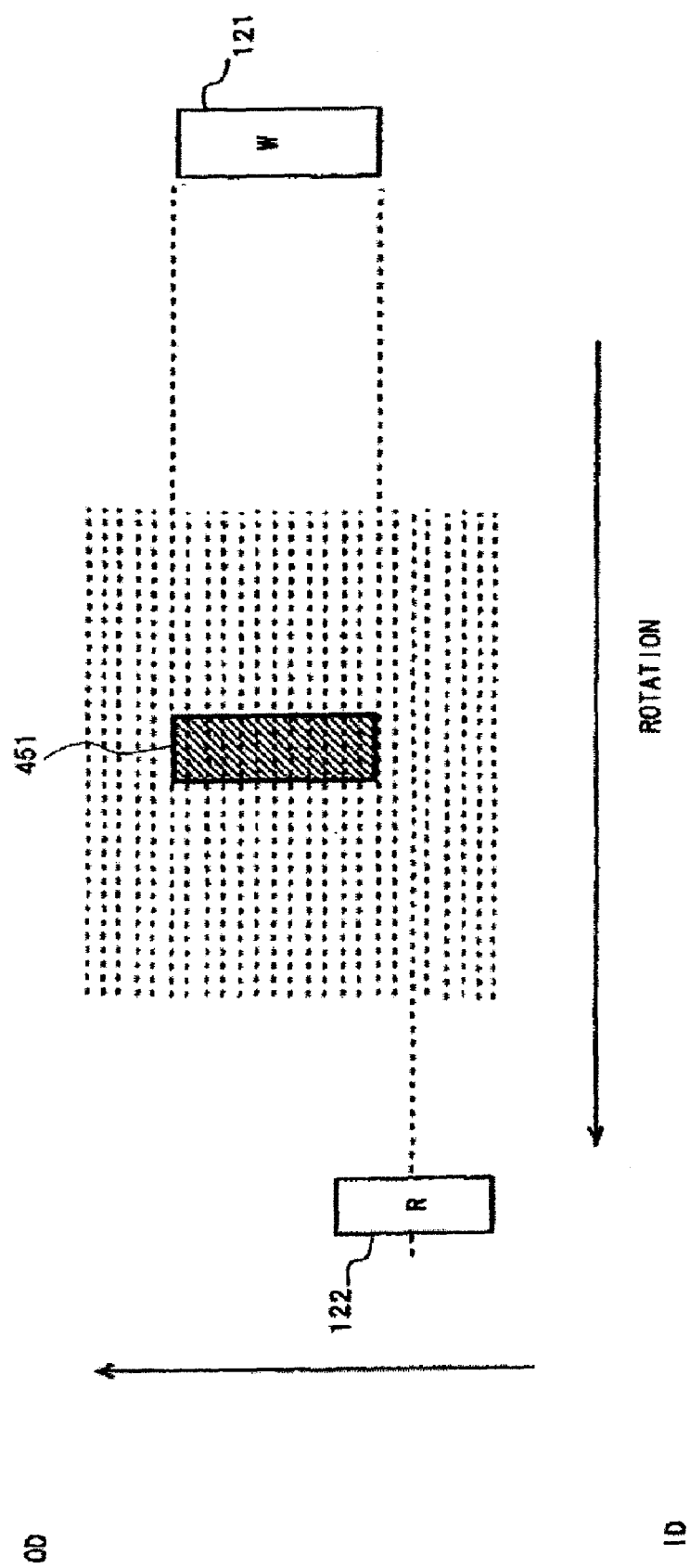
FIG. 7 schematically shows a condition in which a read element 122 reads a burst pattern 451 for specifying a read width and a write width.

The method of specifying the write width Ww and the read width Wr will specifically be explained with reference to FIG. 7. Firstly, the write element 121 writes the burst pattern 451 on the recording surface. The SSW controller 22 uses the read element 122 to read the burst pattern 451. The read element 122 moves with a small pitch from the inner circumferential side in the radial direction, and reads out the burst pattern 451 in each of the radial positions.

The SSW controller 22 uses the radial patterns 117 for positioning the read element 122. The SSW controller 22 controls the head element section 120 to write the radial patterns 117 shown in FIGS. 3 and 4. The radial patterns are written in accordance with the initial reference APC. The SSW controller 22 uses the write element 121 of the propagation head to write the burst pattern 451, and reads the burst pattern 451 by the read element 122.

The SSW controller 22 reads the radial patterns 117 for positioning the read element 122, and calculates the PES value thereof. As shown in FIG. 7, by moving the read element 122 with a small pitch in the radial direction to read out the burst patterns 451 at each of the positions, the SSW controller 22 can specify the relationship between the read out amplitude of the burst pattern 451 and the PES value. The write width Ww and the read width Wr expressed with the PES as the reference value can be specified from the waveform.

Figure 8:
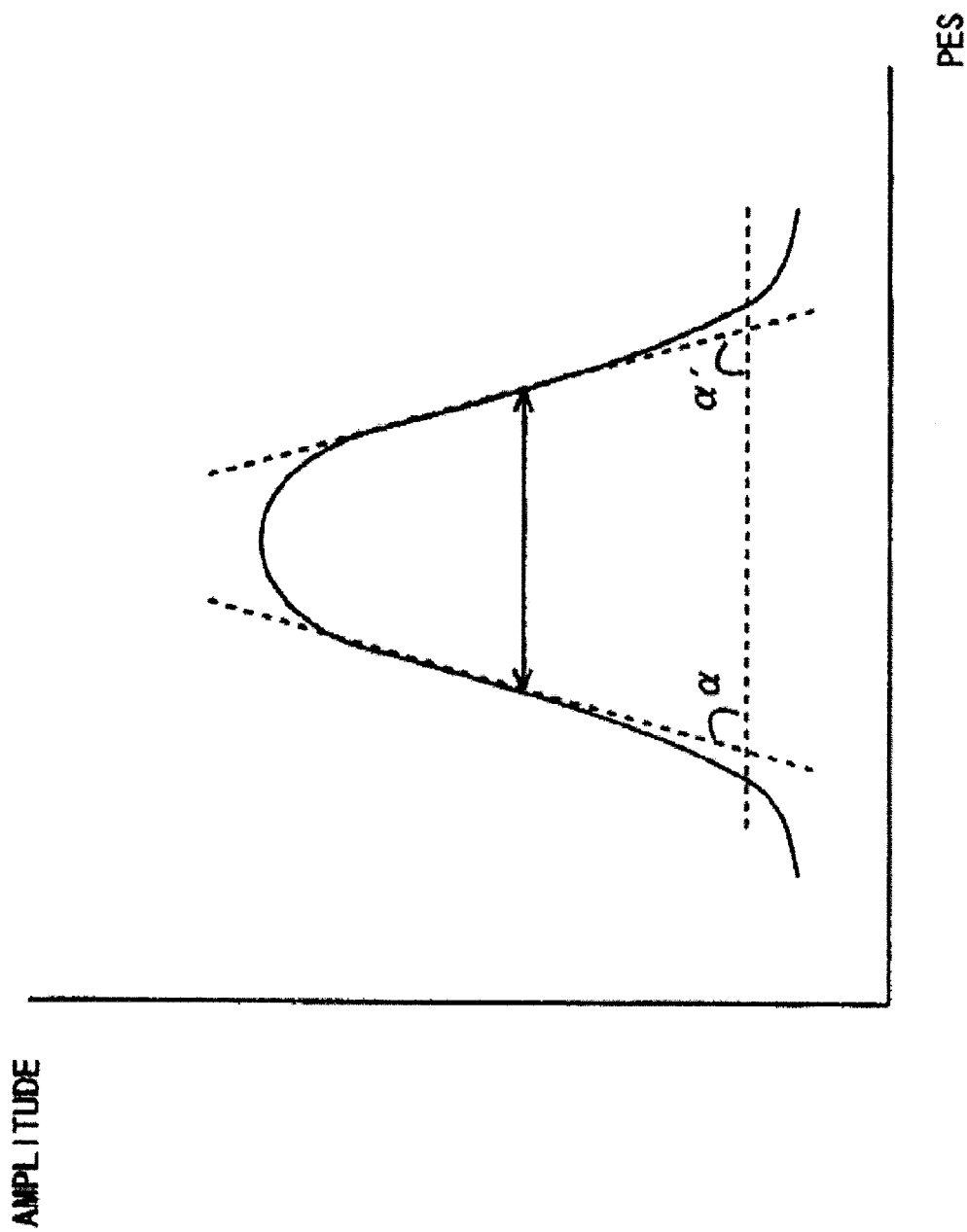
FIG. 8 shows a method of specifying the read width and the write width from the signal obtained by the read element 122 reading the burst pattern 451.

Specifically, the measured read signal of the burst pattern 451 presents the waveform shown in FIG. 8. In the graph shown in FIG. 8, the Y axis represents the read signal amplitude of the read element 122, the X axis represents the PES value obtained by reading the radial patterns 117 of a plurality of servo write tracks. The SSW controller 22 can determine the write width Ww and the read width Wr from the read signal shown in FIG. 8. Specifically, the half bandwidth of the read signal can be defined as the write width Ww. Further, the absolute value of the slope at the half value position of the read signal can be defined as the read width Wr. Preferably, the average of the absolute value of the slopes at the two positions where the read signal becomes the half value is used. Therefore, the write width Ww and the read width Wr are represented using the PES as a unit.

Figure 9:
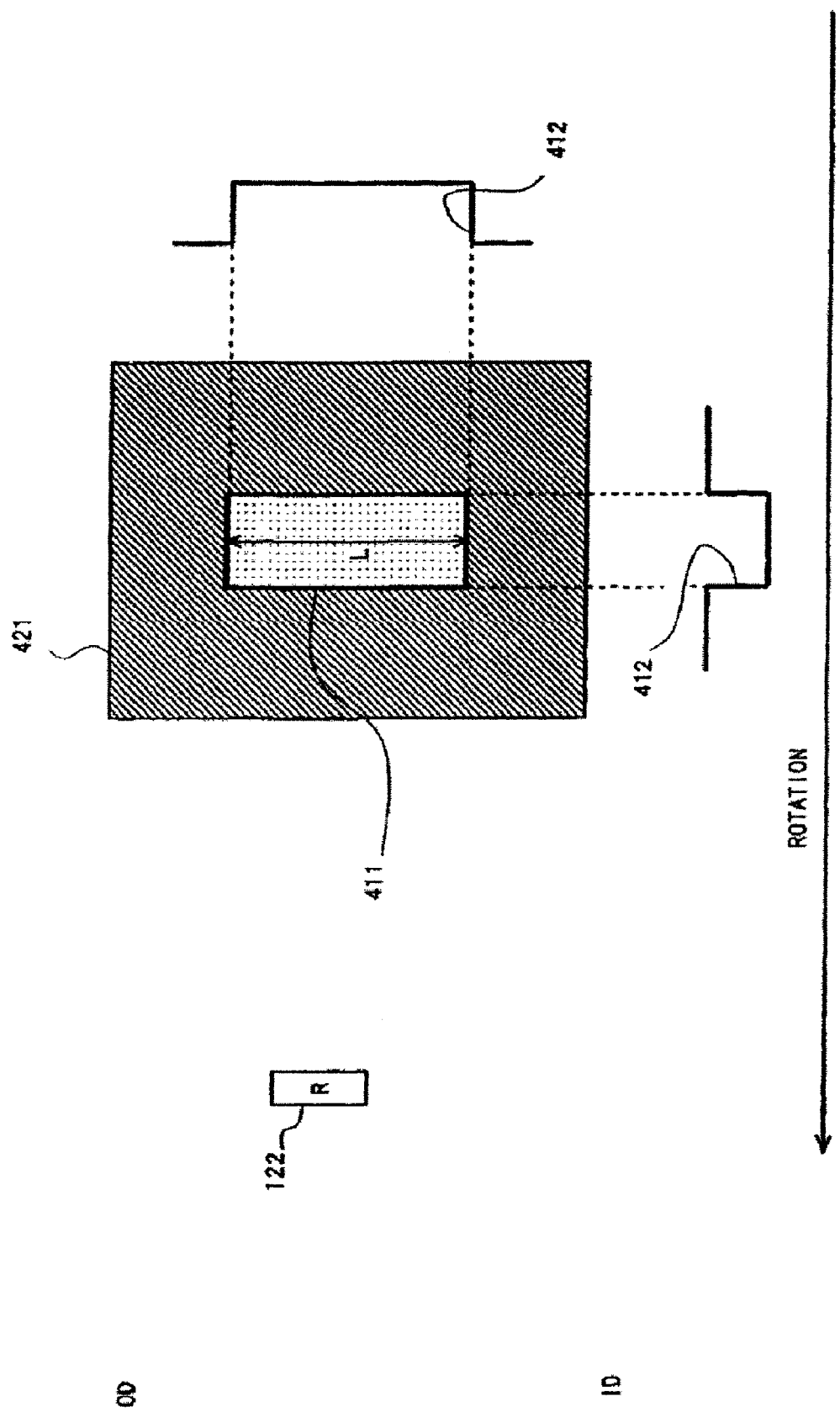
FIG. 9 schematically shows a preferable example of the mark used for determining the reference APC.

FIG. 9 shows a preferable example of the mark used for determining the reference APC. The physical mark 411 shown in FIG. 9 is configured by forming a recess section 412 on the substrate of the magnetic disk 11. For example, the recess section 412 is formed on the substrate using a laser prior to forming the foundation layer or the magnetic layer on the substrate by sputtering. Inside the recess section 412, the same layers as in other areas such as a magnetic layer or a protective layer can be formed. By forming the recess section 412 with a laser, the recess section 412 can be formed with accurate dimensions. The size of the physical mark 411 according to the present embodiment in the radial direction is represented by L. The physical mark 411 has a rectangular shape viewed from a direction of the normal line of the recording surface, and the recess section 412 forms a cuboid space.

The SSW controller 22 writes the burst signal in the area 421 including the physical mark 411 with the write element 121. In the area 421, the signal is written in the magnetic layer inside the recess section 412. The SSW controller 22 performs measurement of the size of the physical mark 411 in the radial direction by the read element 122 reading the signal in the area 421. It should be noted that the center position of the physical mark 411 in the radial direction is preferably the same as the center position of the burst pattern 451 in the radial direction. This is because the write width Ww and the read width Wr vary according to the radial position. Further, in order to accurately measure the size of the physical mark 411, the size thereof in the radial direction is preferably larger than the read width, and is preferably several servo write track pitches.

Figure 10:
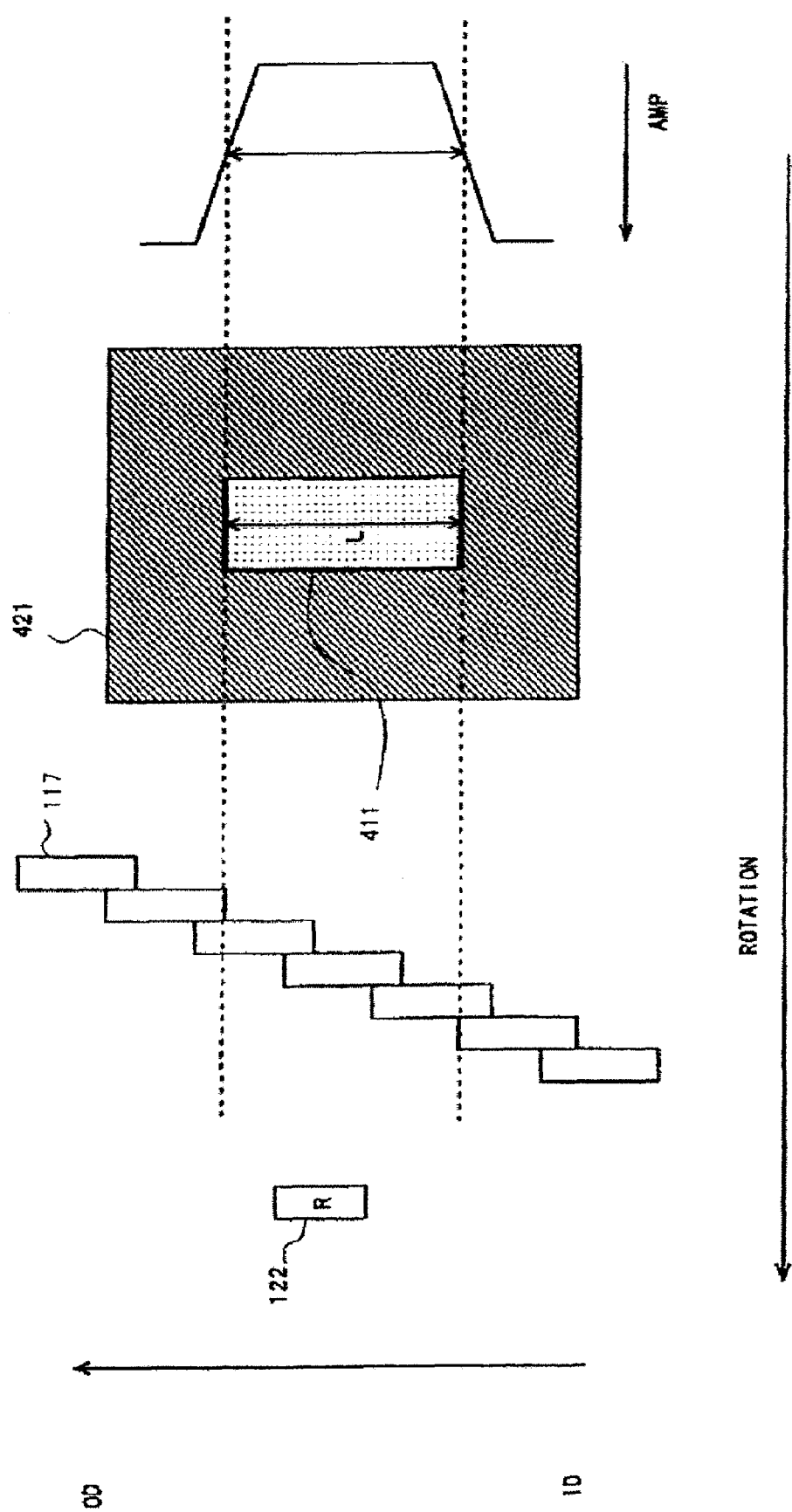
FIG. 10 schematically shows a condition in which the read element 122 reads the mark and measures the size in the radial direction for determining the reference APC.

FIG. 10 schematically shows the condition of the read element 122 reading the magnetic signal in the area 421 including the physical mark 411. In the present embodiment, the SSW controller 22 specifies the size of the physical mark 411 in the radial direction represented by the PES using the read signal of the read element 122. Specifically, the SSW controller 22 reads out the radial patterns 117 in each sector by the read element 122 to position the read element 122 in the target position, thereby reading out the magnetic signal in each of the radial positions in the area 421. Each of the radial patterns 117 is formed in accordance with the initial reference APC determined in the design stage.

As shown in FIG. 10, the amplitude of the read signal of the read element 122 becomes smaller in the area corresponding to the physical mark 411. This is because the distance between the magnetic layer inside the recess section 412 and the head element section 120 is greater than the periphery, and accordingly, the magnetic signal written by the write element 121 is small and the signal read by the read element 122 is also small. It should be noted that the waveform shown in FIG. 10 is nothing more than schematically showing the amplitude signal, and does not accurately show the actual waveform.

In order to accurately measure the size of the physical mark 411, similarly to the measurement of the write width Ww and the read width Wr, the SSW controller 22 moves the read element 122 sequentially with a small pitch in the radial direction and reads out the signal in the area 421 at each of a number of radial positions. For example, the pitch of about a several tenth of the size L of the physical mark 411 in the radial direction is sufficient.

The size L of the physical mark 411 in the radial direction can be defined as the half bandwidth of the signal amplitude. By measuring the size of the physical mark 411 in the condition thus positioned by the radial patterns 117, the SSW controller 22 can specify the size L of the physical mark 411 in the radial direction using the PES as the reference value.

Here, the value of the initial reference APC is assumed to be APC_ini. The SSW controller 22 according to the present embodiment corrects the APC_ini, which is determined by the design, and is previously determined as the same function to the same type of HDD prior to commencement of the SSW, using the measurement result of the size of the physical mark 411, and calculates the APC_tar to be used in actually writing the product servo patterns.

The servo track pitch P_ini (twice as large as the servo write track pitch) of the radial patterns 117 shown in FIG. 10 can be expressed as follows.

$$P\_ini = Ww + Wr(1 - APC\_ini) \quad \text{(mathematical formula 2)}$$

The pitch P_ini, the write width Ww, and the read width Wr are values defined by the PES value.

The pitch P_tar to be newly determined for writing the product servo pattern is defined by the size L of the physical mark 411 in the radial direction. Hereinafter, it is assumed that the target pitch P_tar is defined by kL. In other words, the following relationship is obtained.

$$P\_tar = kL \quad \text{(mathematical formula 3)}$$

It should be noted that k denotes a positive number, and is less than one in the embodiment shown in FIG. 9.

Further, the reference APC used in writing the product servo pattern corresponds to the pitch P_tar to be determined, and accordingly, the APC is expressed as APC_tar. The following relationship is obtained between the APC_tar and the P_tar.

$$P\_tar = Ww + Wr(1 - APC\_tar) \quad \text{(mathematical formula 4)}$$

The write width Ww and the read Wr are the same as the values in the mathematical formula 2. As shown in FIG. 10, by the read element 122 reading both of the radial patterns 117 and the area 421, the SSW controller 22 can specify the relationship between the size L of the physical mark 411 in the radial direction and the PES. Here, it is assumed that the following expression is possible according to the result of the actual measurement.

$$L = x[PES] \quad \text{(mathematical formula 5)}$$

The following relationship can be obtained from the mathematical formulas 3 and 4.

$$kL = P\_tar = Ww + Wr(1 - APC\_tar) \quad \text{(mathematical formula 6)}$$

Further, the following relationship can be obtained from the mathematical formulas 5 and 6.

$$kx = Ww + Wr(1 - APC\_tar) \quad \text{(mathematical formula 7)}$$

Here, the coefficient k has already been known as the determined value. Further, the size x of the physical mark 411 in the radial direction, the write width Ww, and the read width Wr have already been known as the measured values. Therefore, according to the mathematical formula 7, the APC_tar can be calculated. After all, the following expression is possible.

$$APC\_tar = (Ww + Wr - kx)/Wr \quad \text{(mathematical formula 8)}$$

As shown by the mathematical formulas 8 and 2, each of the values of the APC_tar and the APC_ini is specified in the radial position of the physical mark 411. The SSW controller 22 calculates the ratio of the APC_tar to the APC_ini from these values.

$$\alpha = APC\_tar/APC\_ini \quad \text{(mathematical formula 9)}$$

Further, the SSW controller 22 corrects the value of the APC_ini in the entire recording surface by multiplying by $\alpha$ to determine the reference APC (APC_tar) in each of the servo write tracks. The SSW controller 22 sequentially writes the radial patterns 117 and the product servo patterns 115 using the obtained reference APC (APC_tar). Thus, the product servo pattern 115 can be formed with a desired track pitch regardless of the variation in size of the head element section 120.

As described above, the read element 122 measures the size L of the physical mark 411 in the radial direction by reading out the magnetic signals in the area 421 including the physical mark 411. The SSW controller 22 corrects the reference APC, which is previously determined, in accordance with the measured sizes. Although in the above embodiments the write width Ww and the read width Wr are specified using the PES, it is also possible that the SSW controller 22 specifies these values by using the DACOUT, the control signal for controlling the VCM 15.

Typically, the SSW controller 22 performs the reading operation of the burst pattern 451 in the condition of pressing the actuator 16 against the inner circumferential side of crash stop (not shown). The HDA 1 includes the inner circumferential side of crash stop and the outer circumferential side of crash stop to limit the inner circumferential side of rotational range of the actuator 16. The inner circumferential side of crash stop defines the inner circumferential side of rotational limit of the actuator 16, and the outer circumferential side of crash stop defines the outer circumferential side of rotational limit of the actuator 16.

The actuator 16 stops at the position where the elastic force of the inner circumferential side of crash stop and the drive force by the VCM 15 are balanced. Similarly to the embodiment shown in FIG. 7, by gradually reducing the drive force of the VCM 15, the actuator 16 gradually moves towards the outer circumferential side with a small pitch. Regarding the physical mark 411, as described above, the size thereof is specified using the PES. It should be noted that although there are some cases in which the burst pattern 451 and the physical mark 411 are different in the radial positions, if the difference is small, the substantial effect can be neglected.

As shown in the mathematical formulas 2 and 7, the initial reference APC (APC_ini) and the reference APC (APC_tar) to be finally determined become as follows.

$$P\_ini = Ww + Wr(1 - APC\_ini) \quad \text{(mathematical formula 2)}$$

$$kx = Ww + Wr(1 - APC\_tar) \quad \text{(mathematical formula 7)}$$

Further, according to these, the following relationships are obtained.

$$kx/P\_ini = (Ww + Wr(1 - APC\_tar))/(Ww + Wr(1 - APC\_ini)) \quad \text{(mathematical formula 10)}$$

Here, the x and the P_ini are expressed by the PES, and the Ww and the Wr are expressed by DACOUT. According to the mathematical formula 10, the relationship between the APC_tar and the APC_ini is specified. That is, the following is obtained.

$$APC\_tar = 1 + Ww/Wr - kx(Ww + Wr(1 - APC\_ini))/(WrP\_ini) \quad \text{(mathematical formula 11)}$$

According to the mathematical formula 11, the SSW controller 22 can determine the new reference APC_tar from the APC_ini in each of the radial positions. Alternatively, in the mathematical formula 11, other values than the APC_tar are values determined or known by measurement, and the APC_tar is specified as a numerical value. As shown in the mathematical formula 9, it is possible that by calculating the ratio between this value and the APC_ini, and by multiplying the ratio by the APC_ini in each of the radial positions, the new reference APC (APC_tar) in each of the radial positions is determined.

Hereinbefore, although the present invention is described using the preferred embodiments as an example, the present invention is not limited to the embodiments described above. Those skilled in the art can easily modify, add, or substitute each of the elements of an embodiment described above within the scope of the invention. For example, the present invention is not limited to HDD, but can be applied to devices using other types of disks. Although the servo write control device of one embodiment is a separate device from the HDD, it is possible to implement the servo write control function into the control circuit mounted on the HDD.

Although the SSW writes the patterns from the inner circumferential side to the outer circumferential side, it is possible to write the patterns from the outer circumferential side to the inner circumferential side according to the design. Further, the present invention can be applied to the servo writing for specifying the pitch by a different standard from the APC. Further, it is preferable to specify the size of the mark using the PES as a reference amount, but other reference amount such as DACOUT can also be used. Although in one embodiment described above, one continuous mark having a rectangular shape is used as the mark for determining the track pitch, a mark with another shape such as a circle or an ellipse can also be used. Further, a mark composed of a plurality of discrete parts can also be used. For example, a mark composed of two small parts distant from each other in the radial direction can also be used. Further, the method of forming the physical mark is not limited to the embodiments described above.

What is claimed is:

1. A method of performing pitch control of a servo write track on a recording surface of a magnetic disk using a magnetic head having a read element and a write element positioned differently in the radial direction of the magnetic disk, comprising:

reading by the read element an area including a mark previously provided to the magnetic disk and having a known size in the radial direction of the magnetic disk;

specifying the size of the mark expressed by a reference amount based on a magnetic signal obtained by reading the area by the read element;

determining a track pitch based on the specified size of the mark;

writing a pattern with an initial track pitch by the write element in accordance with the determined track pitch; and writing a new pattern by the write element while performing positioning by reading, by the read element, the pattern written by the write element in accordance with the determined track pitch.

2. The method according to claim 1, further comprising:

determining the track pitch for writing the new pattern by correcting the initial track pitch based on the initial track pitch expressed with the reference amount and the specified size of the mark.

3. The method according to claim 2, further comprising:

reading the area by the read element in a condition in which the pattern of the initial track pitch is read by the read element and the positioning is performed, specifying the size of the mark using the reference amount specified by the read signal of the pattern with the initial track pitch.

4. The method according to claim 1, wherein the mark is defined by a convexoconcave shape on the magnetic disk, writing the pattern by a write element on an area overlapping the mark, specifying the size of the mark expressed by a reference amount based on a magnetic signal obtained by reading the pattern in the area overlapping the mark by the read element.

5. The method according to claim 1, wherein the mark is formed of a continuous area, having a greater size in the radial direction of the magnetic disk than a read width.

6. The method according to claim 2, further comprising:
correcting the value defining the initial track pitch showing overlap in the radial direction between the adjacent patterns in the initial track pitch based on the specified size of the mark, thereby determining the track pitch of the new pattern.

7. A device for performing pitch control of a servo write track on a recording surface of a magnetic disk, comprising:
a magnetic head having a read element and a write element positioned differently in a radial direction of the magnetic disk;
a moving mechanism for supporting the magnetic head, and for moving the magnetic head; and
a controller for controlling operations of the moving mechanism and the magnetic head,
wherein the read element reads an area including a mark previously provided to the magnetic disk and having a known size in the radial direction of the magnetic disk,
the controller specifies the size of the mark expressed with a reference amount based on a magnetic signal obtained by reading the area by the read element, and determines a track pitch based on the specified size of the mark,
the moving mechanism performs positioning of the magnetic head by reading, by the read element, a pattern written by the write element based on the determined track pitch,
the write element writes a new pattern to the magnetic disk in the position of the magnetic head moved by the moving mechanism.

8. The device according to claim 7, wherein
the write element writes the pattern with an initial track pitch,
the controller determines the track pitch for writing new pattern by correcting the initial track pitch based on the initial track pitch expressed with the reference amount and the specified size of the mark.

9. The device according to claim 8, wherein
the read element reads the area by the read element in the condition in which the pattern of the initial track pitch is read and the positioning is performed,
the controller specifies the size of the mark using the reference amount specified by the read signal of the pattern with the initial track pitch.

10. The device according to claim 8, wherein
the controller corrects the value defining the initial track pitch showing overlap in the radial direction between the adjacent patterns in the initial track pitch based on the specified size of the mark, thereby determining the track pitch of the new pattern.

11. The device according to claim 7, wherein
the mark is formed of a continuous area, having a greater size in the radial direction of the magnetic disk than a read width.

12. The device according to claim 7, wherein
the mark is defined by a convexoconcave shape on the magnetic disk,
the write element writes a pattern on an area overlapping the mark,
the read element reads a pattern in the area overlapping the mark, and
the controller specifies the size of the mark expressed with the reference amount based on the magnetic signal obtained in reading the pattern by the read element.

* * * * *